D. G. ROLLIN.
Car Spring.
No. 2,777. Reissued Oct. 15, 1867.
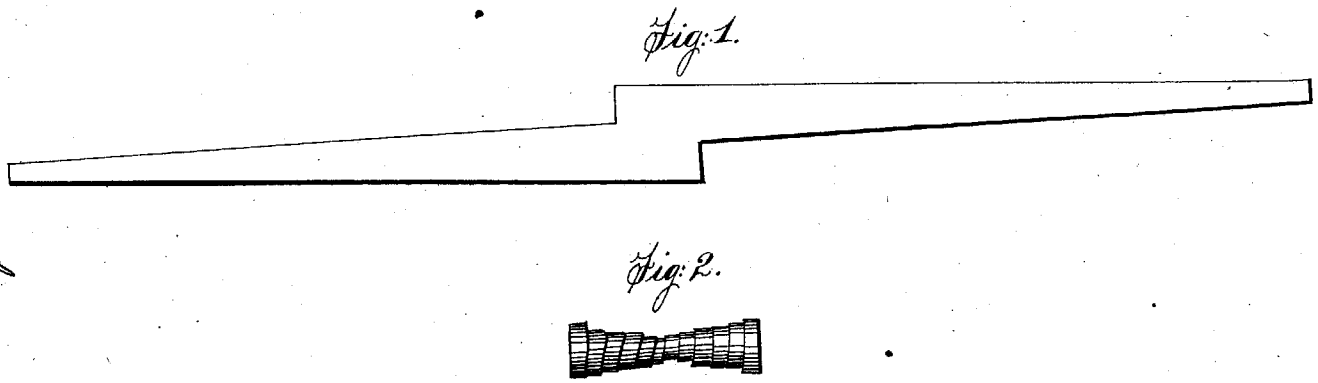
Witnesses } Geo. A. Fisher / Amory T. Gibbs
Assignee of Inventor: Joseph Hobart
N. PETERS, PHOTO-LITHOGRAPHER, WASHINGTON, D. C.

United States Patent Office.

JOSEPH HOBART, OF WALTHAM, MASSACHUSETTS, ASSIGNEE OF DANIEL G. ROLLIN.

*Letters Patent No.* 19,450, *dated February* 23, 1858; *reissue No.* 2,777, *dated October* 15, 1867.

IMPROVED VOLUTE SPRING.

The Schedule referred to in these Letters Patent and making part of the same.

TO ALL TO WHOM IT MAY CONCERN:

Be it known that DANIEL G. ROLLIN, of the city, county, and State of New York, invented a new and useful improvement in Volute Springs, and that the following is a full and exact description thereof, reference being had to the accompanying drawings, and to the letters of reference marked thereon, and making a part of this specification, in which—

Figure 1 represents a view of a plate of steel of the shape required to be made into one of his improved volute springs.

Figure 2 represents a side elevation of one of the springs complete.

Volute springs have hitherto been formed of a flat strip of metal coiled into a spiral form, so as to form a single volute, more or less conical, according to the design of the constructor. Such springs are deficient, as they do not afford sufficient play or movement in the direction in which the weight rests upon them. Hence two or more springs of this description have been placed one above the other, so that the amount of play or movement obtained is equal to the sum of the movements of the separate springs. This mode of combining several springs together is objectionable on account of the difficulty or cost of securing a series of separate springs in such a manner that they shall be sufficiently rigid in a transverse direction to sustain lateral strains.

The object of this invention is to obtain in a volute spring the requisite amount of play in the direction of the endwise strain, with sufficient rigidity to sustain strains transverse thereto; and it consists in a double volute spring, which has the form of two volutes adjoining each other, and is constructed of a strip of metal coiled spirally, so that the rings of the spirals overlap each other, and form ends or bases, which are symmetrical, and play endwise in the same line or axis.

In order to form steel springs of the pattern represented by fig. 2, I pass plates of sheet steel, of the shape shown by fig. 1, and heated in a furnace, through the machine for which Letters Patent were granted him on the twenty-ninth day of December, A. D. eighteen hundred and fifty-seven, (29th December, 1857,) and numbered eighteen thousand nine hundred and ninety-one, (18,991.)

The spring thus formed is a double volute, symmetrical in opposite directions from the centre. It therefore has an amount of play or movement in an endwise direction equal to the sum of the movements of the two volutes, while it is sufficiently rigid in a transverse direction to withstand transverse strains.

Having thus described this invention, I wish it to be understood that I do not confine myself to the peculiar manner in which the double volute spring is made, as this may be varied without affecting the principle of this invention; but what I claim as this invention, and desire to secure by Letters Patent, is—

1. A double volute spring, having the bearing ends symmetrical, and playing endwise in the same line.
2. A double volute spring composed of a single plate, operating substantially as described.

JOSEPH HOBART.

Witnesses:

GEO. A. FISHER,
AMORY T. GIBBS.